(12) United States Patent
Larkner (10) Patent No.: US 7,824,543 B2
(45) Date of Patent: *Nov. 2, 2010

(54) WIRELESS WATER PURIFICATION SYSTEMS AND WIRELESS REMOTE DISPENSING DEVICES FOR WATER PURIFICATION SYSTEMS

(75) Inventor: Thomas Joseph Larkner, Dubuque, IA (US)

(73) Assignee: Barnstead Themolyne Corporation, Dubuque, IA (US)

( * ) Notice: Subject to any disclaimer, the term of this patent is extended or adjusted under 35 U.S.C. 154(b) by 580 days.

This patent is subject to a terminal disclaimer.

(21) Appl. No.: 11/537,360

(22) Filed: Sep. 29, 2006

(65) Prior Publication Data

US 2008/0078710 A1    Apr. 3, 2008

(51) Int. Cl.
*B01D 17/12* (2006.01)
(52) U.S. Cl. .............. 210/87; 210/91; 210/96.1; 210/109; 210/143; 210/194; 210/322; 222/14; 222/23; 222/25; 222/26; 222/40; 222/52; 222/59; 222/189.06; 222/189.08; 340/603; 340/606; 700/231; 700/240

(58) Field of Classification Search ............. 210/85–87, 210/91, 97, 137, 138, 143, 323.1, 449, 459, 210/460, 739, 744, 767, 194, 195.1, 195.2, 210/96.1, 322, 109; 222/1, 23–26, 30, 36, 222/40, 52–56, 59, 189.06, 189.08, 14, 16, 222/20; 340/520, 521, 603, 606, 618, 825; 700/240, 231; 62/389, 390
See application file for complete search history.

(56) References Cited

U.S. PATENT DOCUMENTS 5,143,601 A     9/1992  Slovak et al.

(Continued)

OTHER PUBLICATIONS

Jeffrey Denoncourt, Key Design Considerations for Total Lab Water Systems, Laboratory Design, Jul. 2002, vol. 7, No. 7 (2 pages).

(Continued)

*Primary Examiner*—Joseph W Drodge
(74) *Attorney, Agent, or Firm*—Wood, Herron & Evans LLP (57) ABSTRACT

Wireless water purification systems and wireless remote dispensing devices for a water purification system. The remote dispensing device is fluidly coupled with the main purification unit. A wireless transceiver is associated with the remote dispensing device and another wireless transceiver is associated with the main purification unit. The wireless transceivers communicate across a wireless communications link between the remote dispensing device and the main purification unit. The system may include multiple remote dispensing devices and/or multiple main purification units.

36 Claims, 7 Drawing Sheets

U.S. PATENT DOCUMENTS

| | | | |
|---|---|---|---|
| 5,817,231 A | 10/1998 | Souza | |
| 5,868,924 A | 2/1999 | Nachtman et al. | |
| 5,925,240 A | 7/1999 | Wilkins et al. | |
| 5,935,426 A | 8/1999 | Giordano et al. | |
| 5,988,435 A | 11/1999 | Edwards et al. | |
| 6,001,244 A * | 12/1999 | Salter et al. | 210/104 |
| 6,036,055 A | 3/2000 | Mogadam et al. | |
| 6,101,452 A | 8/2000 | Krall et al. | |
| 6,328,881 B1 | 12/2001 | Larkner et al. | |
| 6,379,560 B1 | 4/2002 | Tilp et al. | |
| 6,432,300 B2 | 8/2002 | Larkner et al. | |
| 6,546,795 B1 | 4/2003 | Dietz | |
| 6,571,151 B1 | 5/2003 | Leatherman | |
| 6,585,885 B2 * | 7/2003 | Larkner et al. | 210/87 |
| 6,799,085 B1 * | 9/2004 | Crisp, III | 700/236 |
| 7,067,054 B2 * | 6/2006 | Fritze | 210/85 |
| 7,306,115 B2 * | 12/2007 | Beachy | 222/20 |
| 7,442,297 B2 * | 10/2008 | Larkner et al. | 210/194 |
| 7,481,917 B2 | 1/2009 | Ikeyama et al. | |
| 2002/0101346 A1 * | 8/2002 | Busick | 340/521 |
| 2003/0109938 A1 * | 6/2003 | Daum et al. | 700/11 |
| 2004/0238420 A1 * | 12/2004 | Oldendorf et al. | 210/91 |
| 2005/0096795 A1 | 5/2005 | Krieter et al. | |
| 2005/0133420 A1 * | 6/2005 | Rinker et al. | 210/143 |
| 2005/0268638 A1 * | 12/2005 | Voglewede et al. | 62/389 |
| 2006/0011526 A1 * | 1/2006 | Baarman et al. | 210/143 |
| 2006/0060512 A1 * | 3/2006 | Astle et al. | 210/85 |
| 2006/0137090 A1 | 6/2006 | Jeffries et al. | |
| 2006/0191829 A1 | 8/2006 | Larkner et al. | |
| 2006/0281435 A1 * | 12/2006 | Shearer et al. | 455/343.1 |
| 2008/0052094 A1 | 2/2008 | Morfopoulos et al. | |

OTHER PUBLICATIONS

Thomas Joseph Larkner, Methods for Wirelessly Operating Water Purification Systems, U.S. Appl. No. 11/537,351 filed Sep. 29, 2006.

Thomas Joseph Larkner et al., Remote Water Dispensing Device and Methods for Operating Such Remote Water Dispensing Devices, U.S. Appl. No. 11/068,122 filed Feb. 28, 2005.

US Patent and Trademark Office, Office Action issued in related U.S. Appl. No. 11/537,351 dated May 20, 2009.

US Patent and Trademark Office, Notice of Allowance issued in related U.S. Appl. No. 11/537,351 dated Dec. 18, 2009.

* cited by examiner

WIRELESS WATER PURIFICATION SYSTEMS AND WIRELESS REMOTE DISPENSING DEVICES FOR WATER PURIFICATION SYSTEMS

FIELD OF THE INVENTION

The invention relates to wireless water purification systems and wireless remote dispensing devices for water purification systems.

BACKGROUND OF THE INVENTION

Standalone water purification systems, which have been commercially available for decades, are used principally in laboratory environments to provide highly purified and high quality reagent grade water for various applications, including chemical analysis and physical testing. Ordinary tap water contains a variety of contaminants or impurities, including dissolved organics, dissolved inorganics, dissolved gases, suspended particles, microorganisms, and byproducts from bacterial degradation. Water purification systems remove a substantial portion of these contaminants and impurities to generate reagent grade water.

Various standards are employed to specify the purity of reagent grade water. One such standard setting forth requirements for water suitable for use in methods of chemical analysis and physical testing is the commonly-accepted standard D1193-99e1 "Standard Specification for Reagent Water" established by the organization ASTM International (West Conshohocken, Pa.). Under this standard, the highest quality reagent grade water, which conforms to, or exceeds, ASTM Type I standards, is generally used in applications like high performance liquid chromatography (HPLC), atomic absorption (AA) spectrometry, and tissue culture. The ASTM Type II grade of reagent water, which has a lower purity than ASTM Type I reagent grade water, may be used for hematological, serological, and microbiological procedures. Reagent grade water suitable for general laboratory qualitative analyses, such as urinalysis, parasitology, and histological procedures, conforms to ASTM Type III standards. The ASTM Type IV grade of reagent water, which conforms to the least stringent standards, is used in applications where these relaxed purity requirements are permitted.

Conventional water purification systems may include a main purification unit that contains a pump that forces water through a fluid circuit and a water purification device capable of removing unwanted contaminants and impurities from water circulating in the fluid circuit. The water purification device may rely on a number of familiar purification techniques, including filtration, single or multiple distillation, sorption, and ion exchange, for removing impurities from the circulating water. The main purification unit often includes a manually operated tap or dispensing valve positioned at a convenient location on the main purification unit that diverts reagent grade water from the fluid circuit for fixed dispensing.

Certain applications dictate the need for a capability of dispensing reagent grade water at a location remote or removed from the main purification unit. A detached dispensing apparatus, which may have the form of a gun or another form such as a solenoid, may be fluidly connected to the main purification unit by a length of flexible tubing. The tubing conveys a flow of reagent grade water from the main purification unit to the remote dispensing apparatus. The dispensing apparatus may be positioned relative to the main purification unit within the spatial limits imposed by the length of the flexible tubing for remotely dispensing reagent grade water. A stream of reagent grade water is continuously circulated through the tubing coupling the main purification unit with the dispensing apparatus and through the dispensing apparatus. When the dispensing apparatus is manually actuated, reagent grade water is dispensed.

Use of a remote dispensing apparatus in a water purification system also conserves space on the bench-top because the main purification unit can be positioned, for example, either under the bench, at the back of the bench, or high on a wall. In certain designs, the remote dispensing apparatus is removably supported in a bracket integrated into the main purification unit and may be optionally used for fixed dispensing local to the main purification unit when mounted in the bracket. Other ways of supporting a remote dispensing apparatus include a wall-mounting bracket or a bracket on a bench-top stand. When removed from the bracket and hand held to dispense purified reagent grade water into a container, the remote dispensing apparatus must be gripped at all times while depressing a gun trigger or with the gun trigger locked.

The remote dispensing apparatus may include electrical components that communicate with the main purification unit across a hard-wired communications link. For example, a remote dispensing apparatus may feature a flow control solenoid that is opened and closed by an electrical signal communicated through conductors inside a cable extending from the main purification unit. However, such cables tend to become entangled with nearby obstacles. Cables also have a finite length and are terminated by electrical connectors on each end. Hence, cable length may be adjusted only by installing a different cable. If a cable is too short, a longer cable must be installed. If the remote dispensing apparatus is moved closer to the main purification unit than the cable length, the unused length of the cable may prove cumbersome and unwieldy. Lengthy leads may also be susceptible to electrical noise or cause electrical noise that interferes with the operation of adjacent noise-sensitive devices. Another deficiency of conventional main purification units is that most only include a single connection point for the cable, which limits the main purification unit for use with only a single remote dispensing apparatus.

Multiple remote dispensing apparatus may be coupled with a single main purification unit by running lengths of tubing of a water loop and electrical cables from the unit to each of the remote dispensing apparatus. In some facilities, an existing fluid loop may extend through the room walls to connect different rooms in which one or more of the remote dispensing apparatus are situated. However, a facility that lacks an existing fluid loop will require remodeling or refurbishing to alter the structure to add a fluid loop servicing multiple rooms. The cabling of remote dispensing apparatus in different facility rooms also presents difficulties. Each of the remote dispensing apparatus should include a cable extending in association with the fluid loop to the main purification unit. The wire gauge scales upwardly with increasing cable length, which increases the cumbersomeness and unwieldiness of the cables. Fluid loops in newly constructed facilities must include associated cabling for establishing communication between the remote dispensing devices and the main purification unit.

In view of these and other deficiencies of conventional water purification systems, it would be desirable to dispense reagent grade water with one or more remote dispensing devices that lack a hard-wired connection with the main purification unit.

SUMMARY OF THE INVENTION

In an embodiment of the invention, an apparatus for dispensing purified water supplied by a main purification unit comprises a remote dispensing device capable of being fluidly coupled with the main purification unit. A wireless transceiver is associated with the remote dispensing device. The wireless transceiver is operative to communicate across a wireless communications link with the main purification unit.

In another embodiment of the invention, a system for dispensing water comprises a main purification unit configured to supply purified water and a remote dispensing device is fluidly coupled with the main purification unit. Wireless transceivers associated with the main purification unit and the remote dispensing device are operative to enable communications across a wireless communications link.

In another embodiment of the invention, a system for dispensing water comprises a main purification unit configured to supply purified water, a first remote dispensing device fluidly coupled with the main purification unit, and a second remote dispensing device is fluidly coupled with the main purification unit. The first remote dispensing device includes a first wireless transceiver operative to communicate with a wireless transceiver of the main purification unit across a first wireless communications link. The second remote dispensing device includes a second wireless transceiver operative to communicate with the wireless transceiver of the main purification unit for communication across a second wireless communications link.

In another embodiment of the invention, a system for dispensing water comprises a first main purification unit and a second main purification unit each configured to supply purified water. A first wireless transceiver is associated with the first main purification unit and a second wireless transceiver is associated with the second main purification unit. A first remote dispensing device is fluidly coupled with the first main purification unit and a second remote dispensing device is fluidly coupled with the second main purification unit. The first remote dispensing device includes a first wireless transceiver operative to communicate with the first wireless transceiver of the first main purification unit across a first wireless communications link. The second remote dispensing device includes a second wireless transceiver operative to communicate with the second wireless transceiver of the second main purification unit across a second wireless communications link.

In another embodiment of the invention, a method is provided for operating a water purification system having a main purification unit and a remote dispensing device including a dispenser fluidly coupled with the main purification unit. The method comprises entering a targeted volume of water or a targeted dispensing time at the remote dispensing device and initiating a water-dispensing event at the remote dispensing device to dispense water from the dispenser. The method further comprises communicating at least one of the targeted volume of water, the targeted dispensing time, or an indication of the initiation of the water-dispensing event in a wireless signal from the remote dispensing device to the main purification unit.

In another embodiment of the invention, a method is provided for wirelessly operating a water purification system having a main purification unit and first and second remote dispensing devices each including a dispenser fluidly coupled with the main purification unit. The method comprises entering a first targeted volume of purified water or a first targeted dispensing time at one of the first and second remote dispensing devices and initiating a first water dispensing event at the one of the first and second remote dispensing devices to dispense the purified water from the respective dispenser. The method further comprises communicating a first wireless signal containing data indicative of at least one of the first targeted volume of water, the first targeted dispensing time, or an indication of the initiation of the first water dispensing event from the one of the first and second remote dispensing devices to the main purification unit.

In another embodiment of the invention, a method is provided for operating a water purification system having a main purification unit having a water outlet and a remote dispensing device including a dispenser fluidly coupled with the main purification unit. At least one of the remote dispensing device or the water purification unit has an RFID tag reader. The method comprises placing a container carrying an RFID tag in proximity to the RFID tag reader and reading a targeted volume of purified water from the RFID tag using the RFID tag reader. The method further comprises dispensing an amount of purified water substantially equal to the targeted volume into the container.

These and other benefits and advantages of the invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE PREFERRED EMBODIMENTS

Figure 1:
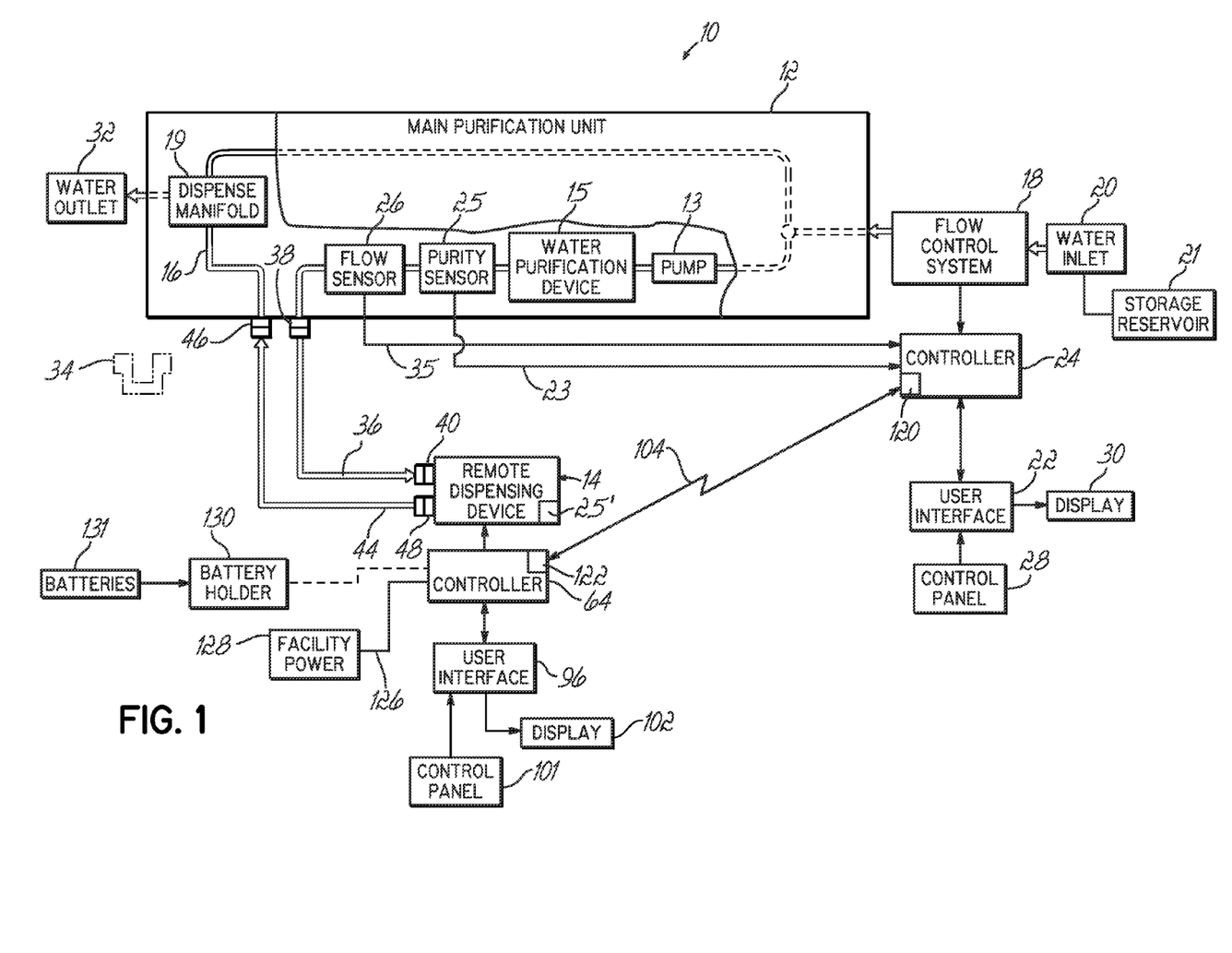
FIG. 1 is a diagrammatic view of a water purification system in accordance with the principles of the invention, which includes a main purification unit and a remote dispensing device.
Figure 2:
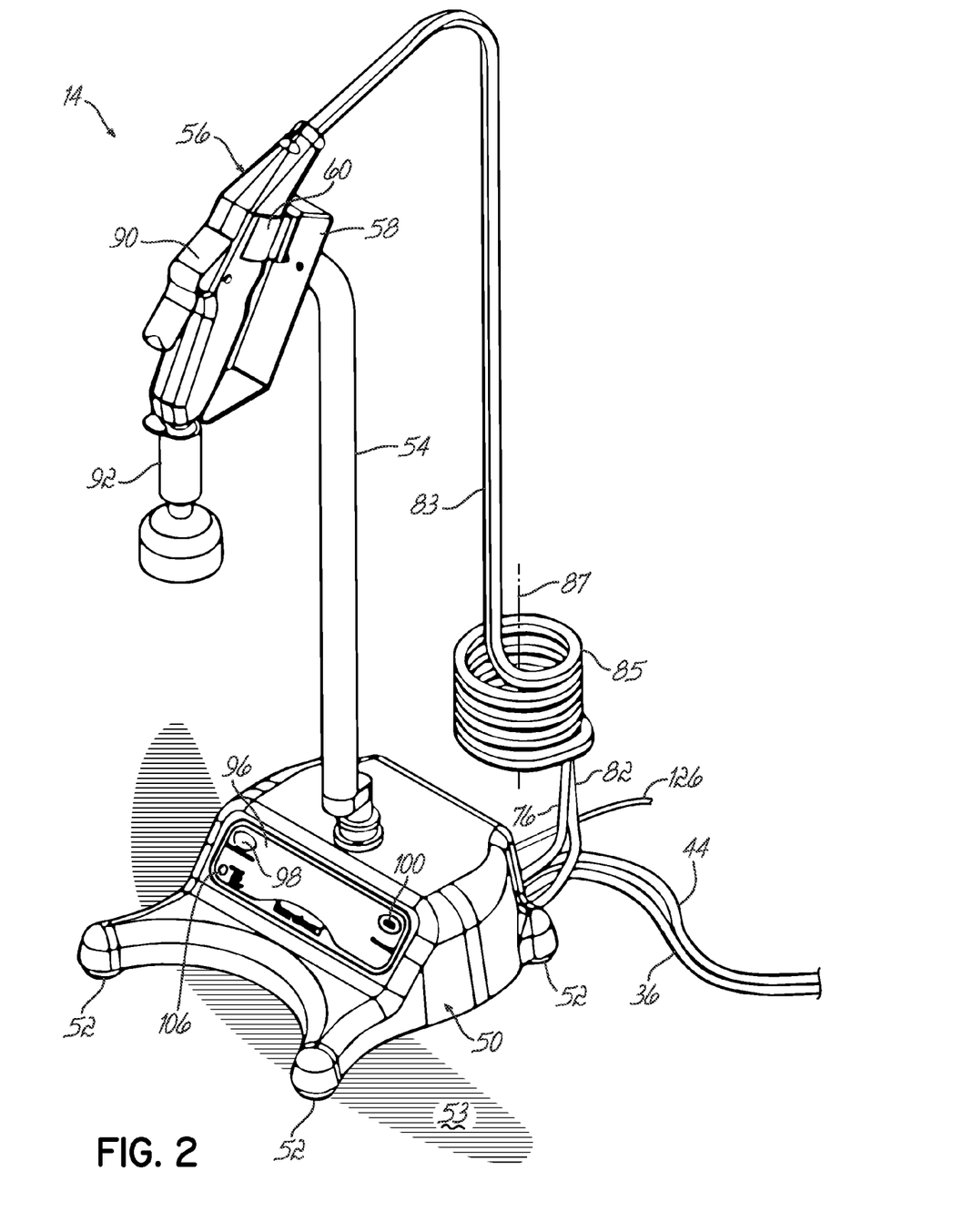
FIG. 2 is a perspective view of the remote dispensing device of FIG. 1.
Figure 3:
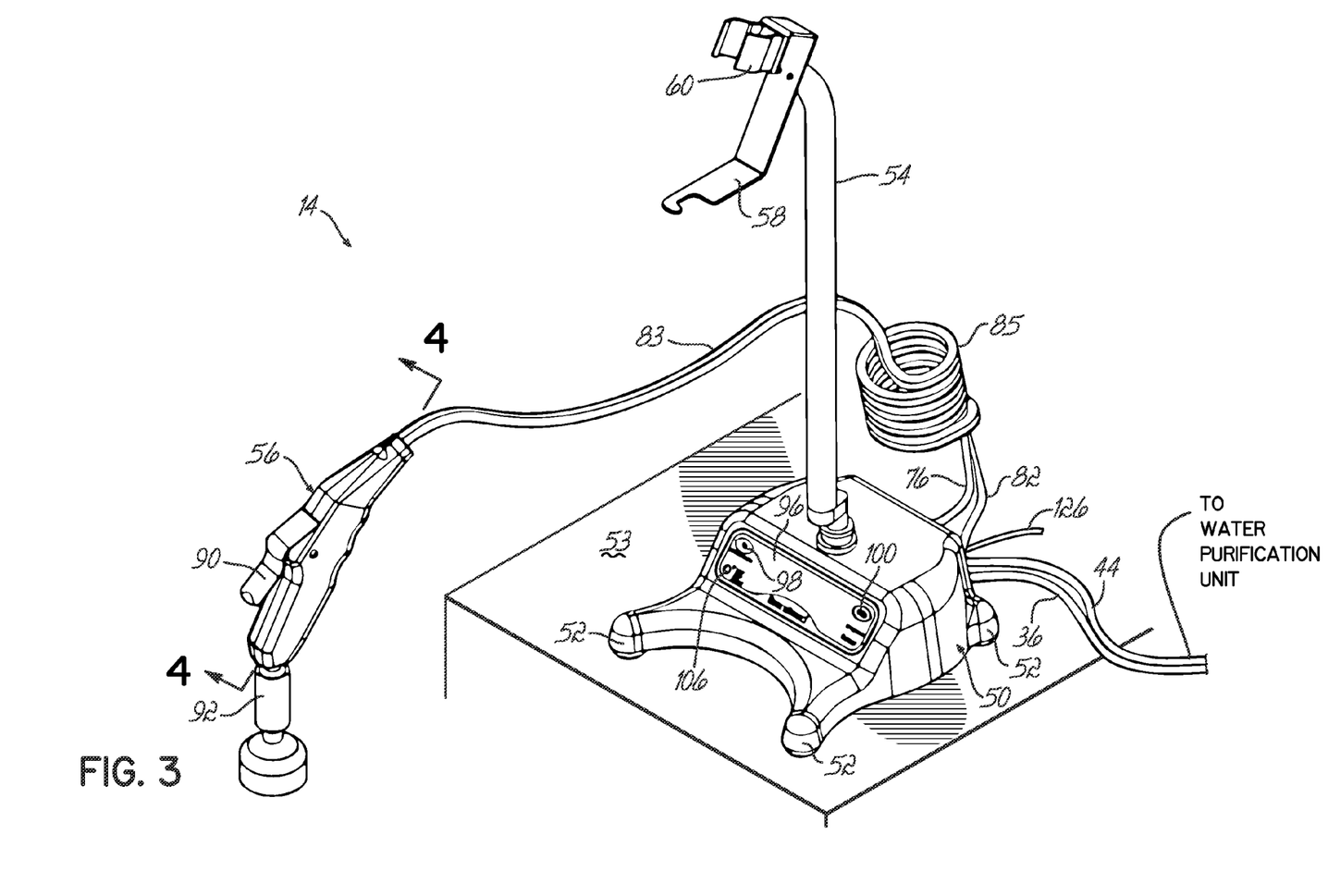
FIG. 3 is a perspective view similar to FIG. 2 in which a dispenser held by the remote dispensing device has been removed from its support bracket.

With reference to FIGS. 1 and 2, a water purification system 10 includes a main purification unit 12 and a remote dispensing apparatus or device 14 fluidly coupled with the main purification unit 12. Main purification unit 12 includes a fluid circuit 16 equipped with various components, including a pump 13 and a water purification device 15. The pump 13 moves water through a purification medium of the water purification device 15 and continuously circulates water through the fluid circuit 16. The water purification device 15 is suitable for producing treated or purified water such as reagent grade water usable in methods of chemical analysis and physical testing, although the invention is not so limited.

An exemplary water purification device 15 is disclosed in U.S. Pat. No. 6,379,560, which is hereby incorporated by reference herein in its entirety. An exemplary main purification unit 12 is disclosed in commonly owned U.S. Pat. Nos. 6,328,881, 6,432,300, and 6,585,885, each of which is hereby incorporated by reference herein in its entirety. Main purification units 12 with which the remote dispensing device 14 may be used include the NANOpure DIamond Ultrapure Water Systems commercially available from Barnstead International (Dubuque, Iowa). The combination of the main purification unit 12 with a wired remote dispensing device, similar to remote dispensing device 14, is disclosed in U.S. patent application Ser. No. 11/068,122; the disclosure of which is hereby incorporated by reference herein in its entirety.

The main purification unit 12 further includes a flow control system 18 that interfaces the fluid circuit 16 with an inlet 20, which is connected by a feed line with a water source, such as a storage tank or reservoir 21 fed by a separate deionized water system. The main purification unit 12 further includes a user interface 22 and a controller 24 coupled with the user interface 22. Software resident in a processor, such as a microprocessor, of the controller 24 and an electrical circuit incorporated into the controller 24 implements commands entered on the user interface 22 to control the operation of the water purification system 10 and, in particular, operation of the flow control system 18. The processor of the controller 24 receives instructions from a memory or like device, and executes those instructions, thereby performing a process defined by those instructions.

The controller 24 is electrically coupled by an electrical cable 35 with a flow sensor 26, which is operative to generate an electronic signal proportional to water flow in the fluid circuit 16 or amounts of purified water dispensed from the fluid circuit 16. The controller 24 uses the electronic signal received from the flow sensor 26 across cable 35 to determine a volume of purified water dispensed from the main purification unit 12. The user interface 22 includes a control panel 28 with input devices and controls such as a keypad, pushbuttons, control knobs, a touch screen, etc. that are used to control the operation of the main purification unit 12. For example, a user can manipulate the control panel 28 of the user interface 22 to enter a numerical value for a target volume of purified water to be dispensed from the fluid circuit 16 into the controller 24. Controller 24 stores the numerical value of the target volume for future use. The user interface 22 may include an output device or display 30 that indicates, for example, a volume of purified water dispensed, or to be dispensed, by the water purification system 10. The invention contemplates that the control panel 28 and display 30 may comprise a composite structure in which, for example, the display 30 is embedded in the control panel 28.

Any volume of purified water dispensed from fluid circuit 16 is replenished by pretreated water admitted by the flow control system 18 through the inlet 20. The flow sensor 26, which may be optionally associated with flow control system 18, monitors the volume of purified water dispensed by the water purification system 10. The dispensed volume may be indicated to the user on display 30 and/or display 102. An exemplary flow control system 18 is disclosed in commonly owned U.S. Pat. Nos. 6,328,881, 6,432,300, and 6,585,885, incorporated by reference above.

The fluid circuit 16 includes a dispense manifold 19 with fluid flow components, such as a solenoid valve, interfaced with controller 24 for controlling the flow of purified water to an optional outlet 32 of the main purification unit 12 and for directing water through the fluid circuit 16 when the path to the outlet 32 is closed. Purified water may be dispensed, at the user's discretion, from the outlet 32 or at the remote dispensing device 14. The user may initiate volumetrically controlled water dispensing from outlet 32 by actuating a switch (not shown) at main purification unit 12.

A removable jumper 34 of the main purification unit 12 is coupled by hydraulic fittings across an outlet 38 and an inlet 46 of the fluid circuit 16. The jumper 34 comprises a conduit that fluidly connects the outlet 38 with the inlet 46 to permit continuous water flow through the fluid circuit 16 when the remote dispensing device 14 is uncoupled from the main purification unit 12. When the jumper 34 is disconnected, as shown in FIG. 1, the hydraulic fittings of the outlet 38 and inlet 46 are accessible for removably coupling the remote dispensing device 14 with the fluid circuit 16. In this instance, a flexible water line or conduit 36 fluidly couples the outlet 38 from the fluid circuit 16 with a passageway 40 (FIG. 5) defined in a manifold 42 of the remote dispensing device 14. Similarly, a flexible water line or conduit 44 couples the inlet 46 to the fluid circuit 16 with a passageway 48 (FIG. 5) defined in the manifold 42.

An electrical cable 23 electrically couples the controller 24 in the main purification unit 12 with a purity sensor 25. The purity sensor 25 samples the purity of the water circulating in fluid circuit 16 on a continuing basis by measuring, for example, water resistivity of the purified water and generates an electronic signal related to the purity of water in the fluid circuit 16. The purity sensor 25 communicates the electrical signal across cable 23 to the controller 24, which uses the electronic signal received from the purity sensor 25 to determine water purity. The controller 24 may use the measured water purity for controlling the operation of the remote dispensing device 14. For example, if the water purity is unacceptable relative to a minimum set point or purity standard, the controller 24 may forbid the remote dispensing device 14 from initiating a dispensing event. The purity sensor 25, which is representatively shown in the fluid circuit 16 between the water purification device 15 and flow sensor 26, may be placed in the fluid circuit 16 between the flow sensor 26 and outlet 38 or between the inlet 46 and the dispense manifold 19. The invention also contemplates that the remote dispensing device 14 may include a purity sensor 25'.

With reference to FIGS. 2-6, the remote dispensing device 14 includes a base 50, a flexible support arm or gooseneck 54 extending away from the base 50, and a manual dispensing gun or dispenser 56. Projecting downwardly from the base 50 are feet 52, which support the remote dispensing device 14 on a surface 53 and elevate the base 50 slightly above the surface 53. The gooseneck 54 may be manipulated for positioning the dispenser 56 relative to the base 50 while the dispenser 56 is mounted in a gripping member or spring clip 60 of a bracket 58. The base 50, gooseneck 54, and bracket 58 collectively constitute a support structure for the dispenser 56.

Figure 5:
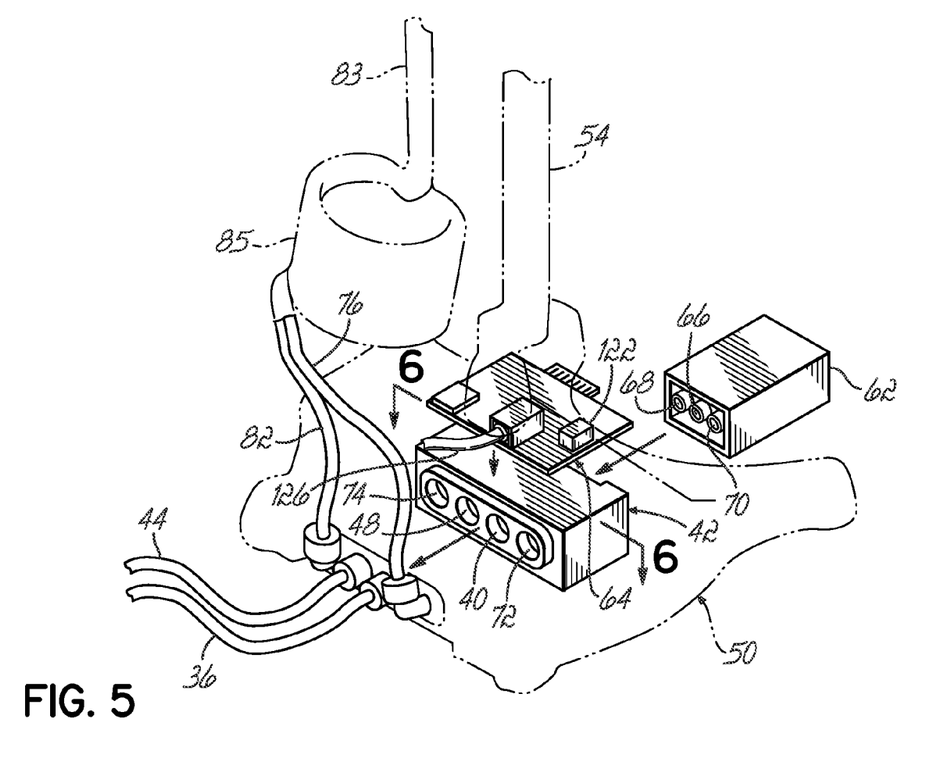
FIG. 5 is an exploded view of the components inside a base of the remote dispensing device.
Figure 6:
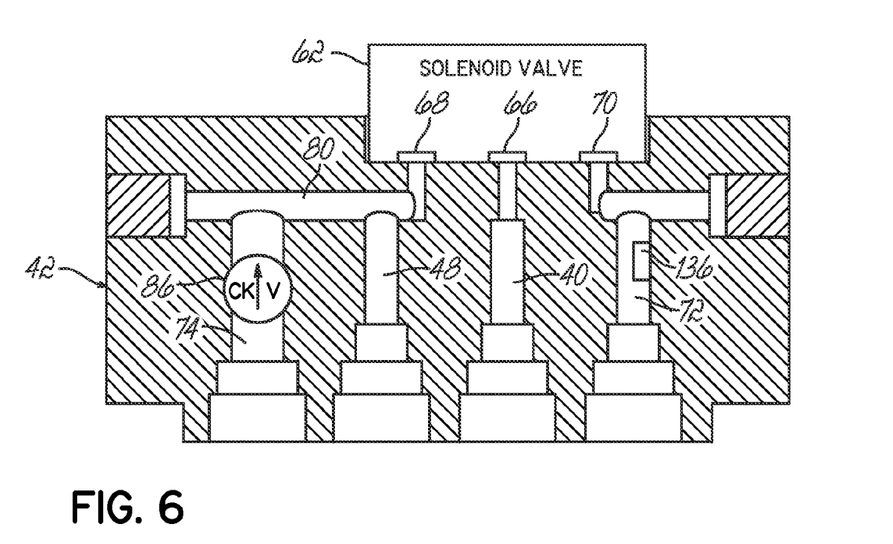
FIG. 6 is a cross-sectional view of a manifold of the remote dispensing device taken generally along line 6-6 in FIG. 5.

Situated and contained inside the base 50 are the manifold 42, a flow control valve preferably in the form of a three port-two way solenoid valve 62, and a controller 64 configured as a board carrying an electrical circuit with electronics or circuitry adapted to, among other things, power and switch the solenoid valve 62. The electrical circuit of the controller 64 may be implemented using analog or digital circuit components, or a programmable microcomputer control that operates in response to stored program instructions. Solenoid valve 62 is operative for directing the flow path of purified water through the manifold 42. The solenoid valve 62 and controller 64 collectively constitute a flow regulation device operative to open and close the flow path for the stream of purified water through the manifold 42, which selectively diverts the flow of the stream of purified water to the dispenser 56. The invention contemplates that other types of flow control valves, as understood by persons of ordinary skill, may be substituted for the solenoid valve 62.

The solenoid valve 62 is configured with an inlet port 66 and a pair of outlet ports 68, 70 among which an internal switching mechanism (not shown) of solenoid valve 62 can select a path for directing a flow of the stream of purified water received from the main purification unit 12. Passageway 40 feeds the stream of purified water received through flexible conduit 36 from the main purification unit 12 to the inlet port 66 of the solenoid valve 62. Passageway 48, which is coupled with outlet port 68 of the solenoid valve 62, returns the stream of purified water through flexible conduit 44 to the main purification unit 12.

The manifold 42 further includes passageways 72, 74 each having an external connection point defined in base 50. Passageway 72, which is coupled with an outlet port 70 of the solenoid valve 62, is further coupled by a flexible conduit 76 with an inlet 78 (FIG. 4) to the dispenser 56. Passageway 74, which is coupled by a connecting passageway 80 with passageway 48, is further coupled by a flexible conduit 82 with an outlet 84 (FIG. 4) from the dispenser 56. A check valve 86 (FIG. 6) in passageway 74 prevents backflow through passageway 74 into flexible conduit 82 when passageway 72 is closed by the solenoid valve 62 to block the flow loop to the dispenser 56. The check valve 86 also provides any back pressure necessary for proper operation of a valve 88 (FIG. 4) inside the dispenser 56. The flexible conduits 76, 82 are confined inside a sheath 83 that extends between the manifold 42 and dispenser 56. The conduits 76, 82 and sheath 83 may have a coiled section, generally indicated by reference numeral 85, that uncoils from a stored condition when the dispenser 56 is moved to a location remote from the gooseneck 54 and bracket 58.

Figure 4:
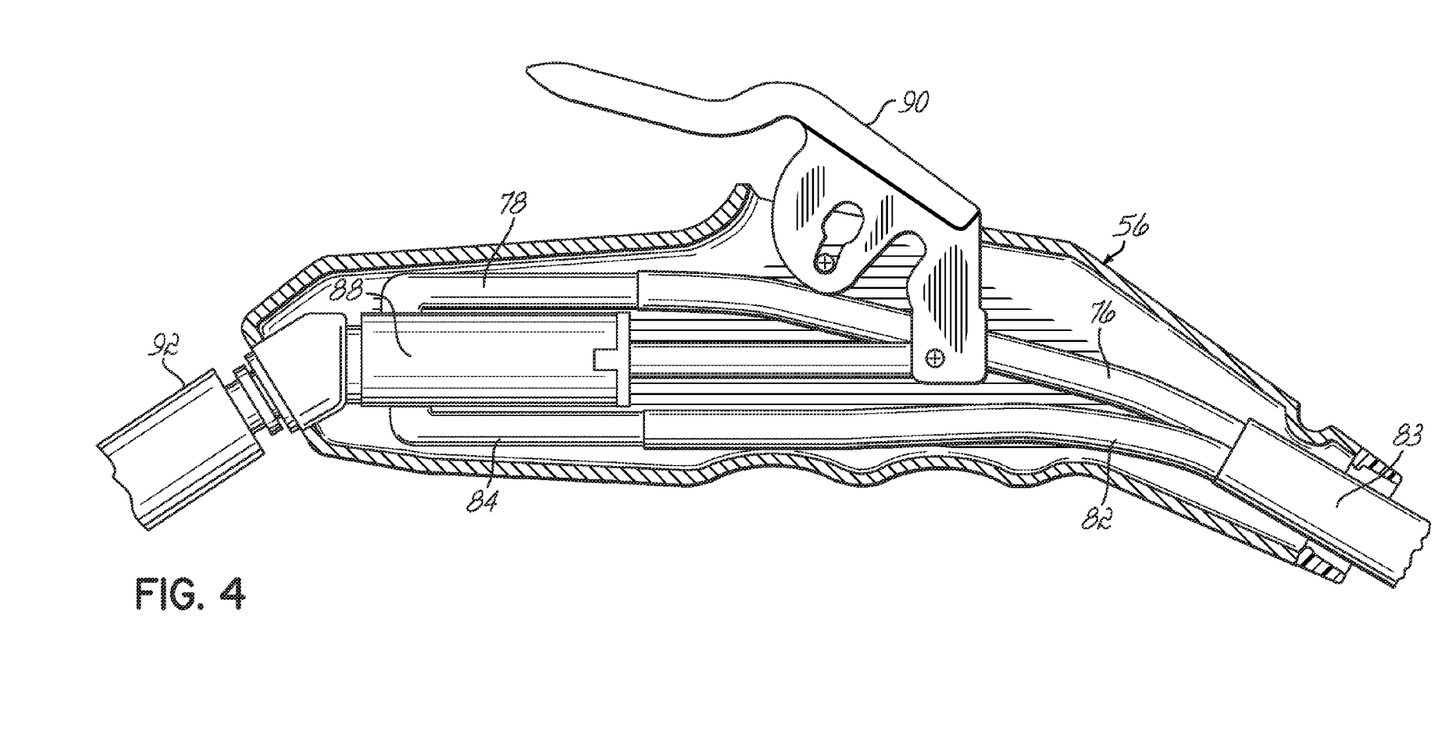
FIG. 4 is a cross-sectional view of the dispenser of the remote dispensing device taken generally along line 4-4 in FIG. 3.

As best shown in FIG. 4, the valve 88 of the dispenser 56 may be operated by manually actuating or otherwise depressing an external trigger 90. When the dispenser 56 is suitably positioned at a point of use and the valve 88 is opened by depressing trigger 90, a stream of purified water may be dispensed through a point-of-use filter 92 having a pore size appropriate for capturing bacteria and particulates. Such dispensers 56 are described, for example, in commonly owned U.S. Pat. No. 5,988,435, which is hereby incorporated by reference herein in its entirety. However, the invention is not so limited as persons of ordinary skill will recognize that any type of recirculating dispenser 56 may be used with the remote dispensing device 14. It should be noted that the main purification unit 12 and remote dispensing device 14 cooperate to control dispensing of purified water from the dispenser 56. In certain embodiments of the invention, dispenser 56 may be replaced by a dispenser (not shown) that is incapable of recirculation, in which case only one of the flexible conduits 76, 82 will be required for transferring purified water to the dispenser 56. Alternatively, dispenser 56 may have the form of a solenoid valve (not shown), which may be similar in construction to solenoid valve 62.

With reference to FIGS. 1-6, the remote dispensing device 14 includes a user interface 96 having a control panel 101 with electrical controls or switches 98, 100 coupled with the electronics or electrical circuit of controller 64 and accessible to the user for entering instructions, commands, and other data. For example, the switches 98, 100 of the control panel 101 may be used to initiate water dispensing and to select between different modes of operation for remote dispensing device 14. The electrical circuit of the controller 64 may respond to commands and other information input at the user interface 96. Switches 98, 100 may be any suitable electrical switch such as touch-sensitive membrane switches. The user interface 96 is coupled internally with the controller 64 for communicating selections made using the switches 98, 100 at the user interface 96 to the electrical circuit of controller 64.

The purified water flow path to the dispenser 56 is switched and controlled by the cooperation between manifold 42 and solenoid valve 62 locally at the remote dispensing device 14. Switch 100 of the user interface 96 may be operated by the user to select between different modes, such as a manual mode of operation and an automatic or volumetric mode of operation, for operating remote dispensing device 14.

In the manual mode of operation, the solenoid valve 62 of remote dispensing device 14 is continuously energized. The outlet port 68 is closed and the outlet port 70 is opened when the solenoid valve 62 is continuously energized. As a result, purified water is directed from passageway 40 through passageways 72, 74 in a flow path through the dispenser 56 and including conduits 76, 82. Purified water flowing through passageway 74 is directed through passageway 48 and returned through conduit 44 to the fluid circuit 16 (FIG. 1) of the main purification unit 12. When the valve 88 (FIG. 4) of the dispenser 56 is operated by depressing external trigger 90, purified water is dispensed on demand through the filter 92 and into a container. In the manual operation mode, there is no targeted volume for dispensed purified water as dispensing continues until the trigger 90 is released. Dispensing is discontinued when the external trigger 90 is released to close the valve 88. The volumetric mode of operation will be described hereinbelow.

Other switches and displays are contemplated by the invention as being integrated into the construction of the remote dispensing device 14. For example, the control panel 101 of user interface 96 may optionally include an electrical control (not shown) similar to switches 98, 100, such as a keypad with a volume increment switch and volume decrement switch or a rotational knob, for programming the target volume of dispensed purified water. A visual indicator or display 102 (FIG. 1) of user interface 96, which may be graphical or character based, may be used, among other things, to display the target volume to the user at the location of the remote dispensing device 14.

Electronics or circuitry is provided on both the controller 24 of the main purification unit 12 and the controller 64 of the remote dispensing device 14 for exchanging information. To that end, the controllers 24, 64 communicate over a wireless communications link 104 for bi-directionally transmitting command and information signals between the main purification unit 12 and the remote dispensing device 14. The wireless signals between the main purification unit 12 and the remote dispensing device 14 may be exchanged using signal carrier modalities of ultrasonic signals, and electromagnetic signals such as microwave signals, radio-frequency (RF) signals, and optical signals including, but not limited to, near-infrared radiation signals or high frequency fluorescent light switching. The signal carrier modality may be RF signals, which do not require a line-of-sight path for transmission of the carrier energy. The wireless communications link 104 allows data to be transmitted between the main purification unit 12 and remote dispensing device 14 without a physical connection or intermediate device.

In one embodiment, the wireless communications link 104 comprises a wireless transmitter-receiver or transceiver 120 for transmitting and receiving wireless signals incorporated into the controller 24 of main purification unit 12, or otherwise associated with the controller 24. The wireless communications link 104 further comprises a wireless transceiver 122 for transmitting and receiving wireless signals and incorporated into the controller 64 of the remote dispensing device 14, or otherwise associated with the controller 64. The transceivers 120, 122 may each have a built-in antenna for transmitting and receiving wireless signals, which may be transmitted and received according to any desired encoding and modulating scheme. Transceiver 120 is attached or otherwise secured to the remote dispensing device 14 and, similarly, transceiver 122 is also attached or otherwise secured to the main purification unit 12.

Controllers 24, 64 encode the transmitted wireless signals for transmission and decode the received wireless signals, as required, for retrieving data from the signals. The data may include commands, for example, for controlling the main purification unit 12 and the remote dispensing device 14, as appropriate or, as another example, numerical information. The visual display 102 at the remote dispensing device 14 may display standard operating characteristics of the main purification unit 12, such as water purity, water temperature, mode of operation, flow rate, dispense volume remaining, amount dispensed, water volume in the storage reservoir 21, etc. communicated from the main purification unit 12 across wireless communications link 104.

With continued reference to FIGS. 1-6, the electrical components of remote dispensing device 14, and at least the wireless transceiver 122, are powered by a power source 124. Power source 124 may be an alternating current (AC) or direct current (DC) power source supplied over an electrical cable 126 extending from facility power 128 and independent of the main purification unit 12. Alternatively, one or more batteries 131, which are installed in a battery holder 130 carried by the remote dispensing device 14, may power the electronics of the remote dispensing device 14. Batteries 131 may be, for example, alkaline batteries, lithium batteries, rechargeable batteries, or thin-film batteries.

In the volumetric mode of operation, the visual display 102 of user interface 96 (FIG. 1) may be used to directly enter in a volume of water to be dispensed by the remote dispensing device 14 or a specific amount of time over which water is dispensed from the remote dispensing device 14. The solenoid valve 62 of remote dispensing device 14 remains de-energized with outlet port 70 closed and outlet port 68 opened to provide a closed-loop, circulation path through flexible conduits 36, 44 between the main purification unit 12 and remote dispensing device 14. The gooseneck 54 is manipulated to position dispenser 56 relative to a container for hands-free fixed dispensing or the dispenser 56 is held manually at a location for non-fixed dispensing. The trigger 90 is manually locked to open the valve 88 (FIG. 4). However, purified water is not directed to the dispenser 56 until instructed by controller 64.

Control switch 98 is depressed to cause controller 64 to initiate volumetric dispensing of the entered volume from dispenser 56. The controller 64 energizes the solenoid valve 62, which closes outlet port 68 and opens outlet port 70 to supply a flow path for purified water to the dispenser 56. Purified water is immediately diverted through outlet port 70 of the solenoid valve 62 to passageway 72 of manifold 42 and through conduit 76 to dispenser 56 in a flow path destined for subsequent and immediate dispensing through filter 92.

The volume of water or time and an indication of the initiation of a dispensing event or cycle are encoded by the controller 64 and transmitted by the transceiver 122 of remote dispensing device 14 as a wireless signal across wireless communications link 104 to the transceiver 120 of the main purification unit 12. The controller 24 at the main purification unit 12, after decoding the data in the received signal, dynamically tracks the volume of water dispensed using the flow sensor 26, if a volume is dispensed, or accumulates an elapsed time. When the flow control system 18 senses that the volume of water has been supplied to the remote dispensing device 14 or that the time has lapsed, the controller 24 transmits a wireless signal using transceiver 120 over the wireless communications link 104 back to the remote dispensing device 14.

The wireless signal, after being received by the transceiver 122 of the remote dispensing device 14 and decoded by the controller 64, commands the electrical circuit of the controller 64 to de-energize the solenoid valve 62 to discontinue dispensing from dispenser 56. When returned to the de-energized state, the outlet port 70 of solenoid valve 62 is closed and the outlet port 68 of solenoid valve 62 is opened to block the flow path to the dispenser 56 and to re-establish the recirculation path between the main purification unit 12 and the remote dispensing device 14. In this manner, the user can remotely set the target volume at the location of the remote dispensing device 14 and communicate that selection wirelessly to the main purification unit 12 for use by controller 24 of the main purification unit 12 in performing a volumetric dispense cycle.

In an alternative embodiment of the invention, the user interface 96 may lack the visual display 102 and, instead, the volume or time may be entered on the main purification unit 12. Upon pressing control switch 98 on the remote dispensing device 14, the controller 64 energizes the solenoid valve 62 to dispense purified water from dispenser 56. The controller 64 uses transceiver 122 to communicate a wireless signal to the transceiver 120 of the main purification unit 12 indicating initiation of a dispense cycle. Upon receipt, the controller 24 at the main purification unit 12 decodes the information in the wireless signal and uses flow sensor 26 to volumetrically monitor the flow of purified water to the remote dispensing device 14 or the elapsed time. When the controller 24 detects that the volume of water has been supplied to the remote dispensing device 14 or the controller 24 determines that the targeted dispense time has lapsed, the controller 24 communicates a wireless signal using transceiver 120 over the wireless communications link 104 back to the remote dispensing device 14. The wireless signal, after being received by transceiver 122 and decoded by controller 64, commands the controller 64 of the remote dispensing device 14 to switch the solenoid valve 62 to discontinue dispensing from dispenser 56.

As another example, the controller 24 may periodically communicate a signal across wireless communications link 104 to the remote dispensing device 14 corresponding to the product water purity, as measured by purity sensor 25, being either above or below a minimum value. The water purity may alternatively be monitored by purity sensor 25' stationed at the remote dispensing device 14. The user interface 96 of the remote dispensing device 14 may include a visual indicator 106, such as a light emitting diode (LED), that indicates the product water purity. For example, the visual indicator 106 may illuminate if water purity is above the minimum acceptable value. If the purity is insufficient, the controller 64 may de-energize solenoid valve 62 and prematurely discontinue volumetric dispensing from dispenser 56. If the remote dispensing device 14 is operating in manual mode, dispenser 56 is locked open, and water purity drops below the purity set point. During the manual dispense, The remote dispensing device 14 reverts into volumetric mode with the solenoid valve 62 de-energized. In addition, switch 100 may be disabled from changing from volumetric mode to manual mode if the purity does not exceed the purity set point. This prohibits a user from dispensing purified water at the remote dispensing device 14 if the purity does not exceed the purity set point.

The wireless connection of the remote dispensing device 14 to the main purification unit 12 represents a significant improvement over conventional water purification systems. The wirelessly controlled remote dispensing device 14 is only fluidly coupled by water connections to the main purification unit 12 but lacks electrically wired or hard-wired connections via electrical conductors to the main purification unit 12. This flexibility allows for having many varying distances of water tubing (i.e., one meter from main purification unit 12, ten meters from unit 12, etc.). The limitation on distance is the length of tubing that still affords sufficient pressures at the remote dispensing device 14; not the length of an electrical cable. Consequently, a user does not require an inventory of electrical cables having different wire lengths or a large length of wire that is coiled and stored when the remote dispensing device 14 is positioned near the main purification unit 12.

A benefit of the invention is a new or refurbished facility may have a fluid loop installed without electrical cabling for electrically connecting the remote dispensing device 14 with the main purification unit 12 to establish a hard-wired communications link. If the remote dispensing device 14 is powered by battery 131, then a power connection, such as electrical cable 126, is likewise not required. In this completely wireless embodiment, the remote dispensing device is portable among different locations in a facility by simply establishing and breaking a fluid connection with the facility fluid loop.

The remote dispensing device 14 may comprise a different type of device (not shown), including but not limited to a dishwasher or a clinical chemistry analyzer system, each equipped with a flow control valve that regulates dispensing to control the dispensing of purified water from the main purification unit 12 for use in the device.

The remote dispensing device 14 may be an accessory to the main purification unit 12 as either an alternate dispensing device or one of many dispensers in water purification system 10. Alternatively, the remote dispensing device 14 may be the sole dispenser incorporated into the water purification system 10.

Figure 7:
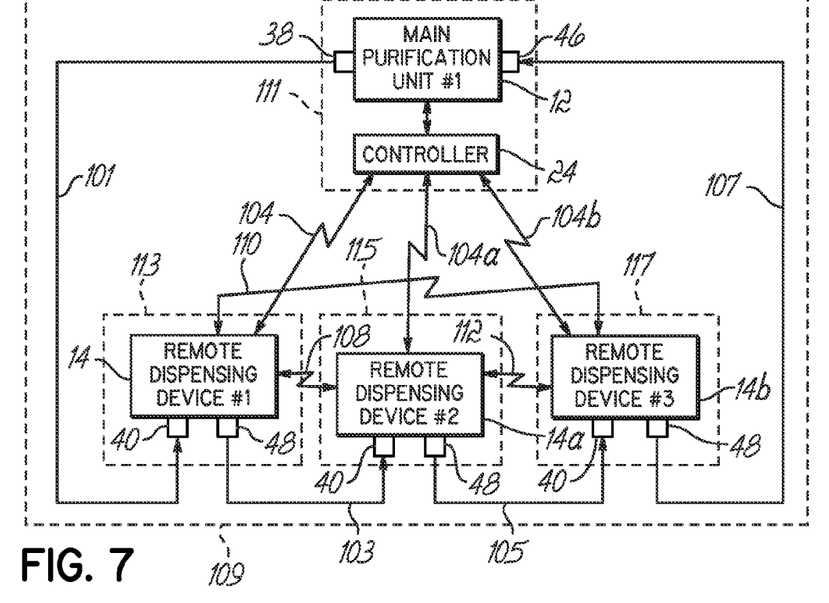
FIG. 7 is a diagrammatic view of a water purification system in accordance with an alternative embodiment of the invention.

With reference to FIG. 7, additional remote dispensing apparatus or devices 14a, 14b, each similar or identical to remote dispensing device 14, may be controlled across bi-directional wireless communications links 104a, 104b, respectively, that are each similar to communications link 104. The remote dispensing apparatus 14, 14a, 14b may communicate with each other across a wireless network or mesh. Specifically, remote dispensing apparatus 14 and remote dispensing device 14a may bi-directionally transmit command and information signals across a communications link 108 using their respective transceivers 122 (FIG. 1). Similarly, remote dispensing device 14 and remote dispensing device 14b may bi-directionally transmit command and information signals across a communications link 110 using their respective transceivers 122 and remote dispensing device 14a and remote dispensing device 14b may bi-directionally transmit command and information signals across a communications link 112 using their respective transceivers 122. Each of the remote dispensing devices 14, 14a, 14b on the wireless mesh is freed from the need for wired connections. Various wireless network protocols are available to facilitate communications over the communications links 108, 110, 112 comprising the wireless mesh.

The remote dispensing devices 14, 14a, 14b are daisy-chained together for supplying a closed water circulation path with the main purification unit 12. The inlet passageway 40 of remote dispensing device 14 is fluidly coupled by flexible conduit 101 with the outlet 38 of the fluid circuit 16 of main purification unit 12. The inlet passageway 40 of remote dispensing device 14a is fluidly coupled by flexible conduit 103 with the outlet passageway 48 of remote dispensing device 14. Similarly, the inlet passageway 40 of remote dispensing device 14b is fluidly coupled by flexible conduit 105 with the outlet passageway 48 of remote dispensing device 14a. The outlet passageway 48 of remote dispensing device 14b is fluidly coupled by flexible conduit 105 with inlet 46 of the fluid circuit 16 of main purification unit 12. The flow sensor 26 in the main purification unit 12 may be used for controlling volumes of water dispensed from the main purification unit 12, if equipped with water outlet 32, or from any of the remote dispensing devices 14, 14a, 14b.

The multiple remote dispensing devices 14, 14a, 14b and main purification unit 12 and controller 24 may be physically located in different rooms of a building or facility 109. For example, remote dispensing device 14 may be located in room 111, remote dispensing device 14a may be located in room 113, remote dispensing device 14b may be located in room 115, and the main purification unit 12 and controller 24 may be located in room 117. Other embodiments with more than one of the devices 14, 14a, 14b in any one of the rooms 111, 113, 115, 117 and/or unit 12 in the same one of the rooms 111, 113, 115, 117 as one or more of the devices 14, 14a, 14b are envisioned by embodiments of the invention. Advantageously, the multiple remote dispensing devices 14, 14a, 14b located in different rooms 111, 113, 115 of a facility 109 do not require hard-wired connections for operation.

Alternatively, a volumetric flow sensor 136 (FIG. 6), similar to flow sensor 26, may be located in the remote dispensing device 14, in flexible conduit 36, or between flexible conduit 36 and connection 40. A similar flow sensor 136 may also be positioned with any of these locations in each of the other remote dispensing devices 14a, 14b. Flow sensor 136 is operative to generate an electronic signal proportional to water flow in the manifold 42 or volumes of purified water dispensed from dispenser 56 and to supply the electronic signal to the controller 64. Each of the remote dispensing devices 14, 14a, 14b may transmit signals relating to, for example, flow volume and flow rate sensed by the corresponding flow sensor 136 or the initiation of a water dispensing event across the wireless communications link 104, 104a, 104b, respectively, to the main purification unit 12 for independent display on display 30 and a level of independent decision-making for each of the remote dispensing devices 14, 14a, 14b. This information may also be used by the controller 24 for logging the dispensed volume of water and other information relating to the dispensing event at remote dispensing devices 14, 14a, 14b. As a result, each of the multiple remote dispensing devices 14, 14a, 14b may simultaneously dispense the purified water generated by the main purification unit 12, while optionally receiving information about the purity of the purified water and/or the mode of operation of the main purification unit 12.

Consistent with the principles of the invention, each of the remote dispensing devices 14, 14a, 14b may be replaced by a different type of remote dispensing device (not shown), including but not limited to a dishwasher or a clinical chemistry analyzer system.

Figure 7A:
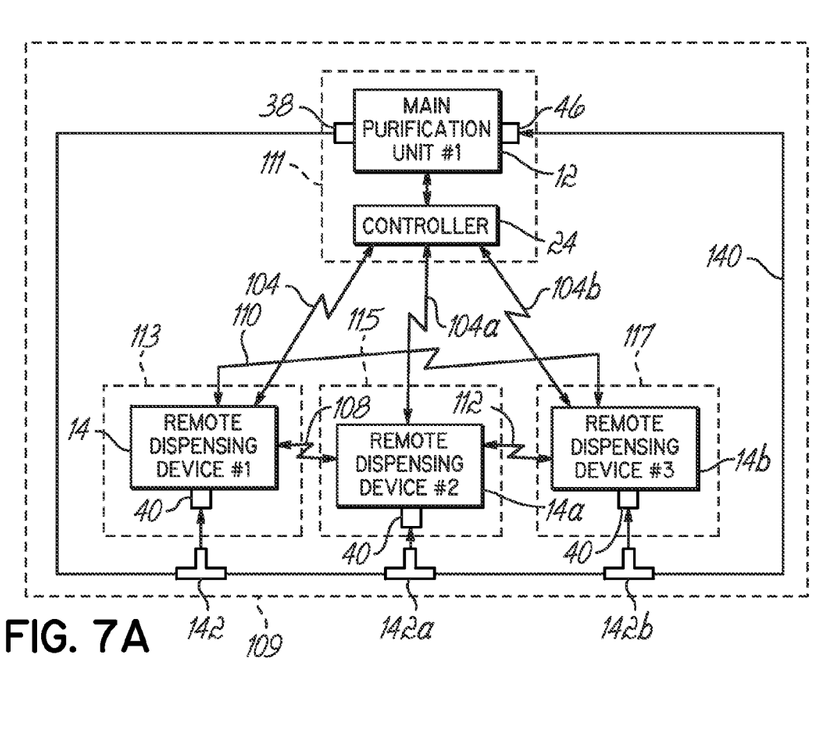
FIG. 7A is a diagrammatic view similar to FIG. 7 of a water purification system in accordance with an alternative embodiment of the invention.

With reference to FIG. 7A in which like reference numerals refer to like features in FIG. 7 and in an alternative embodiment of the invention, inlet passageway 40 of two or more of the remote dispensing devices 14, 14a, 14b may receive purified water from a flexible conduit 140 connecting the outlet 38 and inlet 46 of main purification unit 12. The flexible conduit 140 defines a common water feed for the remote dispensing devices 14, 14a, 14b and also defines a circulation path for purified water to prevent stagnation. The remote dispensing devices 14, 14a, 14b may bi-directionally transmit command and information signals across communications links 108, 110, 112 so that each device 14, 14a, 14b can be informed that another of the devices 14, 14a, 14b is actively dispensing purified water. In the instance that devices 14, 14, 14b are not equipped with flow sensor 136, the main purification unit 12 may forbid non-dispensing ones of the devices 14, 14a, 14b from dispensing purified water until the dispensing event concludes at the active one of the devices 14, 14a, 14b. Alternatively, the communications between the devices 14, 14a, 14b may be directed across links 104, 104a, 104b.

The flexible conduit 140 may be configured to minimize any potential "dead legs" in which water flow is restricted. To that end, a tee 142 is placed in flexible conduit 140 at the location of remote dispensing device 14. Similarly, a tee 142a is placed in flexible conduit 140 at the location of remote dispensing device 14a and a tee 142b is placed in flexible conduit 140 at the location of remote dispensing device 14b. Each of the tees 142, 142a, 142b has a relatively short central leg that couples the dispenser 56 (FIG. 2) of the corresponding one of the remote dispensing devices 14, 14a, 14b with the flexible conduit 140. In this embodiment, the dispenser 56 for each device 14, 14a, 14b may advantageously have the construction of a solenoid valve (not shown), as described above. Outlet passageway 48 (FIG. 5) may be omitted in this embodiment of the invention, as recirculation is not required of the dispenser 56 itself as the flexible conduit 140 performs recirculation.

Figure 7B:
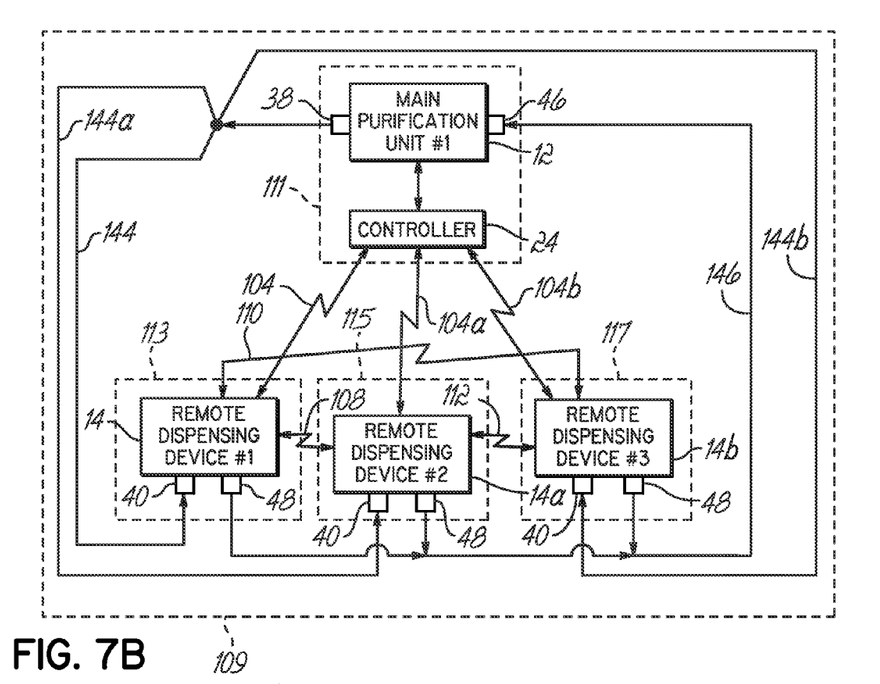
FIG. 7B is a diagrammatic view similar to FIG. 7 of a water purification system in accordance with an alternative embodiment of the invention.

With reference to FIG. 7B in which like reference numerals refer to like features in FIG. 7 and in an alternative embodiment of the invention, inlet passageway 40 of each of the remote dispensing devices 14, 14a, 14b may receive purified water through a corresponding one of multiple dedicated flexible conduits 144, 144a, 144b. The flexible conduits 144, 144a, 144b branch from outlet 38 of main purification unit 12. Passageway 48 of each of the remote dispensing devices 14, 14a, 14b is coupled fluidly by a common recirculation line 146 with the inlet 46 of main purification unit 12.

Figure 8:
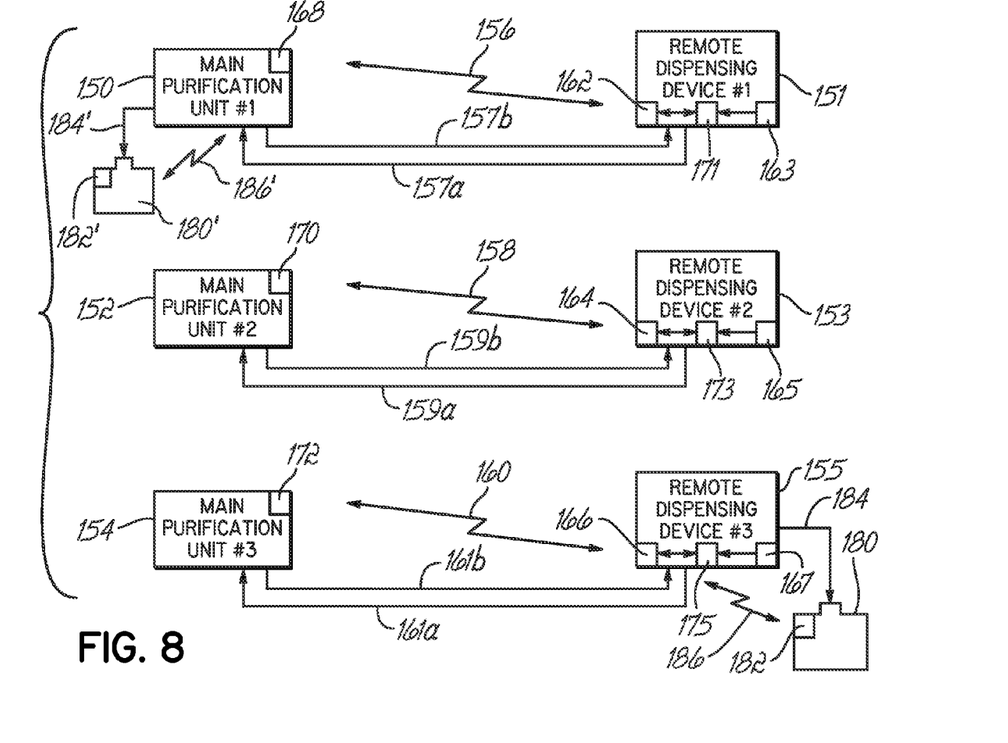
FIG. 8 is a diagrammatic view of a laboratory environment featuring multiple remote dispensing units and multiple main purification units.

With reference to FIG. 8 in which like reference numerals refer to like features in FIGS. 1-7 and in accordance with an alternative embodiment of the invention, a laboratory environment of a facility 109 (FIG. 7) may feature multiple main purification units 150, 152, 154, each substantially identical to main purification unit 12, and multiple remote dispensing devices 151, 153, 155, each substantially identical to remote dispensing device 14. Although three main purification units 150, 152, 154 and three remote dispensing devices 151, 153, 155 are described, a person having ordinary skill in the art will appreciate that the invention is not so limited.

The controller 64 of remote dispensing device 151 communicates with the controller 24 of main purification unit 150 across a bi-directional wireless communications link 156 established between transceivers 162, 168 similar to transceivers 120, 122 (FIG. 1). The controller 64 of remote dispensing device 153 communicates with the controller 24 of main purification unit 152 across a bi-directional wireless communications link 158 established between transceivers 164, 170 similar to transceivers 120, 122 (FIG. 1), respectively. The controller 24 of main purification unit 154 communicates with the controller 64 of remote dispensing device 155 across a bi-directional wireless communications link 160 established between transceivers 166, 172 similar to transceivers 120, 122 (FIG. 1), respectively. The architecture of the wireless communications links 156, 158, 160 may be configured such that the communications links 156, 158, 160 are independent and lack cross-communication.

The fluid circuit 16 of main purification unit 150 is fluidly coupled with remote dispensing device 151 by a hydraulic path consisting of flexible conduits 157a,b, which may be similar to flexible conduits 36, 44 (FIG. 1) and permit purified water to return to the fluid circuit 16 of unit 150 during, for example, periods when purified water is not being dispensed. Similarly, the fluid circuit 16 of main purification unit 152 is fluidly coupled with remote dispensing device 153 by a hydraulic path consisting of flexible conduits 159a,b and the fluid circuit 16 of main purification unit 154 is fluidly coupled with remote dispensing device 155 by a hydraulic path consisting of flexible conduits 161a,b. Flexible conduits 159a,b and 161a,b are each similar to flexible conduits 157a,b and permit purified water to recirculate with respect to fluid circuit 16 of units 152, 154.

In one embodiment of the invention, each of the main purification units 150, 152, 154 and each of the remote dispensing devices 151, 153, 155 may be adapted to send or receive a wireless 'ping' for purposes of device recognition and operational pairing. For each device pair, the 'pings' are communicated between the pair of transceivers 162, 168, the pair of transceivers 164, 170, and the pair of transceivers 166, 172. For example, each of the remote dispensing devices 151, 153, 155 may be triggered to emit a 'serialized ping' over a specific timeframe as a signal encoded with information, such as the type of device, a unique device identification or serial number, etc. Each of the main purification units 150, 152, 154 may be triggered to learn and react to the 'serialized ping' of a corresponding one of the remote dispensing devices 151, 153, 155. As a result, each of the main purification units 150, 152, 154 is taught to react to only one of the remote dispensing devices 151, 153, 155 in the laboratory environment. This has the effect of exclusively dedicating communications link 156 to link main purification unit 150 with remote dispensing device 151, communications link 158 to link main purification unit 152 with remote dispensing device 153, and communication links 160 to link main purification unit 154 with remote dispensing device 155.

Conversely, each of the main purification units 150, 152, 154 may be triggered to emit the 'serialized ping' and each of the remote dispensing devices 151, 153, 155 instructed to react to only one of the main purification units 150, 152, 154.

As a result, each of the remote dispensing devices 151, 153, 155 is taught to react to only one of the main purification units 150, 152, 154 in the laboratory environment.

Alternatively, each of the main purification units 150, 152, 154 and each of the remote dispensing devices 151, 153, 155 may be assigned a unique address for purposes of device recognition and operational pairing. Each of the main purification units 150, 152, 154 would store the unique address of the corresponding one of the remote dispensing devices 151, 153, 155. Similarly, each of the remote dispensing devices 151, 153, 155 would store the unique address of the corresponding one of the main purification units 150, 152, 154. As a result, communication is established between each of the remote dispensing devices 151, 153, 155 and only one of the main purification units 150, 152, 154, and vice-versa, in the laboratory environment.

In an alternative embodiment of the invention, radio frequency identification (RFID) tags 171, 173, 175 may be attached to or incorporated into each of the remote dispensing devices 151, 153, 155, respectively. The RFID tags 171, 173, 175 are activated upon receipt of a predetermined signal. The transceivers 168, 170, 172 of the main purification units 150, 152, 154 may comprise RFID tag readers each configured to read data from and/or write data to a corresponding one of the RFID tags 171, 173, 175 when in mutual proximity.

The RFID tags 171, 173, 175 associated with remote dispensing devices 151, 153, 155, respectively contain electrical circuits, memory, and antennas to enable them to receive and respond to radio-frequency queries from a corresponding one of the RFID tag readers of transceivers 168, 170, 172. The RFID tags 171, 173, 175 may be passive and, thus, require no internal power source. The requisite power is typically provided by the signal from the RFID tag reader of the respective one of the transceivers 168, 170, 172, which activates the respective RFID tag when information is requested. Alternatively, the RFID tags 171, 173, 175 may be active and, thus, require a power source. Typically, the RFID tags 171, 173, 175 have a communication range of about a meter and may transit and/or receive in a low frequency band (30-300 kHz), high frequency band (3-30 MHz), a ultra-high frequency band (300 MHz to 3 GHz), a microwave band (5.8 GHz), another suitable frequency, or any combination of these frequency bands.

Each of the RFID tags 171, 173, 175 stores a unique identification, which is remotely retrieved by the tag reader of a corresponding one of the transceivers 168, 170, 172. Each of the tags 171, 173, 175 may also be communicably coupled with a corresponding memory storage device 163, 165, 167, such as a flash memory, that provides additional storage capabilities. The memory storage devices 163, 165, 167 may be any temporary or persistent memory module with any suitable memory capacity.

When remote dispensing device 151 is placed into close proximity with main purification unit 150, the controller 24 of unit 150 would initiate a setup procedure, after the RFID tag 171 associated with remote dispensing device 151 is sensed by the RFID tag reader associated with transceiver 168, to initiate the wireless communications link 156 that is dedicated to this specific device couple. When remote dispensing device 153 is placed into close proximity with main purification unit 152, the controller 24 of unit 152 would initiate a setup procedure, after the RFID tag 173 associated with remote dispensing device 153 is sensed by the RFID tag reader associated with transceiver 170, to initiate the wireless communications link 158 that is dedicated to this specific device couple. When remote dispensing device 155 is placed into close proximity with main purification unit 154, the controller 24 of unit 154 would initiate a setup procedure, after the RFID tag 175 associated with remote dispensing device 155 is sensed by the RFID tag reader associated with transceiver 172, to wireless initiate the communications link 160 that is dedicated to this specific device couple.

In yet alternative embodiment of the invention, each of the RFID tags 171, 173, 175 and the respective one of the memory storage devices 163, 165, 167 may be merged to comprise a smart card or button chip and the RFID tag readers of transceivers 168, 170, 172 may each comprise a smart card or button chip reader. In this instance, physically allowing each of the remote dispensing devices 151, 153, 155 to communicate with a reader of a corresponding one of the main purification units 150, 152, 154 may simultaneously program each device pair to control and/or react to the other.

With continued reference to FIG. 8, purified water may be dispensed from, for example, remote dispensing device 155 into a container 180. Container 180 may carry an RFID tag 182 that stores data indicating a volume of purified water representative of the capacity of the container 180. The transceiver 166 of remote dispensing device 155 includes a tag reader adapted to retrieve the information stored on the RFID tag 182 across a communications link 186. After reading the targeted volume, the remote dispensing device 155 can initiate a water dispensing event, as diagrammatically indicted by single-headed arrow 184, to fill the container 180 with an amount of purified water substantially equal to the stored volume on the RFID tag 182. This represents an alternative approach for determining a targeted volume of purified water to be dispensed, as opposed to manual user entry of a targeted volume at user interface 96 (FIG. 1) of the remote dispensing device 155.

A container 180', which is substantially identical to container 180, may carry and RFID tag 182' and receive purified water direction from, for example, the water outlet 32 (FIG. 1) of main purification unit 150. The transceiver 168 of main purification unit 150 includes a tag reader adapted to retrieve the information stored on RFID tag 182' across a communications link 186'. After reading the targeted volume, the main purification unit 150 can initiate a water dispensing event, as diagrammatically indicted by single-headed arrow 184', from the water outlet 32 of the main purification unit 150 to the container 180' with an amount of purified water substantially equal to the stored volume on the RFID tag 182'.

In alternative embodiments of the invention, each of the remote dispensing devices 151, 153, 155 may comprise a different type of remote dispensing device (not shown) including, but not limited to, a dishwasher or a clinical chemistry analyzer system each having a valve to control the dispensing of purified water from the respective main purification units 150, 152, 154 for use in the device.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A wireless system for dispensing purified water, the wireless system comprising:

a main purification unit configured to supply the purified water, the main purification unit including a wireless transceiver;

a remote dispensing device configured to be fluidly coupled with said main purification unit for receiving purified water supplied from said main purification unit, said remote dispensing device including a dispenser, a support structure configured to hold said dispenser, and a flow control valve configured to selectively divert the purified water for dispensing from said dispenser; and a wireless transceiver associated with said remote dispensing device, said wireless transceiver of said remote dispensing device and said wireless transceiver of said main purification unit operative to enable communications across a wireless communications link for controlling said flow control valve.

2. The wireless system of claim 1 wherein said remote dispensing device comprises:

a controller coupled electrically with said electrically-powered component and with said wireless transceiver of said remote dispensing device, said controller adapted to encode first wireless signals for transmission across said wireless communications link to said wireless transceiver of said main purification unit and to decode second wireless signals received across said wireless communications link from said wireless transceiver of said main purification unit.

3. The wireless system of claim 2 wherein said remote dispensing device further comprises:

a user interface electrically coupled with said controller, said user interface including a user input device for converting user input to electrical signals and supplying the electrical signals to said controller.

4. The wireless system of claim 1 wherein said support structure is detached from said main purification unit.

5. The wireless system of claim 1 wherein said remote dispensing device further comprises:

a battery holder associated with said support structure, said battery holder adapted to receive a battery for powering said flow control valve, said controller, and said wireless transceiver.

6. The wireless system of claim 1 wherein said remote dispensing device further comprises:

a battery holder adapted to receive a battery for powering said wireless transceiver.

7. The wireless system of claim 1 wherein said wireless transceivers are adapted to communicate across said wireless communications link using at least one of ultrasonic signals or electromagnetic signals.

8. The wireless system of claim 1 wherein said wireless transceivers are adapted to communicate across said wireless communications link using at least one of microwave signals, radio-frequency signals, or optical signals.

9. The wireless system of claim 1 wherein said remote dispensing device further comprises a flow sensor adapted to measure a flow rate of the purified water at said remote dispensing device.

10. The wireless system of claim 9 wherein said main purification unit includes a purity sensor configured to monitor a purity of the purified water supplied from the main purification unit to the remote dispensing device.

11. The wireless system of claim 1 wherein said main purification unit includes a fluid circuit, an inlet to the fluid circuit, and an outlet from the fluid circuit, and said manifold of said remote dispensing device is fluidly coupled with said outlet for receiving a flow of the purified water from the fluid circuit and is fluidly coupled with said inlet for returning the flow of the purified water to the fluid circuit.

12. The wireless system of claim 1 wherein said support structure includes a base, a support arm extending from said base, and a bracket on said support arm, said dispenser configured to be mounted in said bracket, and said base configured to support said remote dispensing device on a surface.

13. The wireless system of claim 12 wherein said support arm is configured to be manipulated to position said dispenser relative to said base when said dispenser is mounted in said bracket.

14. The wireless system of claim 1 wherein said remote dispensing device includes a manifold configured to be fluidly coupled with the main purification unit for receiving the purified water supplied from the main purification unit, and said flow control valve is configured to selectively divert the purified water from said manifold to said dispenser.

15. A wireless system for dispensing purified water, the wireless system comprising:

a main purification unit configured to supply the purified water, said main purification unit including a wireless transceiver;

a first remote dispensing device fluidly coupled with said main purification unit for receiving purified water, said first remote dispensing device including a first dispenser, a first support structure configured to hold said first dispenser, a first flow control valve configured to selectively divert the purified water for dispensing from said first dispenser, and a first wireless transceiver operative to communicate across a first wireless communications link with said wireless transceiver of said main purification unit for controlling said first flow control valve; and a second remote dispensing device fluidly coupled with said main purification unit for receiving purified water, said second remote dispensing device including a second wireless transceiver operative to communicate with said wireless transceiver of said main purification unit across a second wireless communications link.

16. The wireless system of claim 15 wherein said wireless transceiver of said main purification unit, said first wireless transceiver of said first remote dispensing device, and said second wireless transceiver of said second remote dispensing device are adapted to communicate using ultrasonic signals or electromagnetic signals.

17. The wireless system of claim 15 wherein said wireless transceiver of said main purification unit, said first wireless transceiver of said first remote dispensing device, and said second wireless transceiver of said second remote dispensing device are adapted to communicate using microwave signals, radio-frequency signals, or optical signals.

18. The wireless system of claim 15 wherein at least one of said first and second remote dispensing devices further comprises a flow sensor adapted to detect a flow rate of the purified water at said at least one of said first and second remote dispensing devices.

19. The wireless system of claim 15 wherein said main purification unit further comprises a flow sensor adapted to detect a flow rate of the purified water.

20. The wireless system of claim 15 wherein said main purification unit includes a fluid circuit, an inlet to the fluid circuit, and an outlet from the fluid circuit, and said first and said second remote dispensing devices are each fluidly coupled with said outlet for receiving a flow of the purified water from the fluid circuit and is fluidly coupled with said inlet for returning the flow of the purified water to the fluid circuit.

21. The wireless system of claim 15 wherein at least one of said first and second remote dispensing devices-has an input coupled and a recirculation output fluidly with said main purification unit, said input and said recirculation output cooperating to recirculate purified water from said at least one of said first and second remote dispensing devices to said main purification unit.

22. The wireless system of claim 15 wherein said second remote dispensing device includes a second dispenser, a second support structure configured to hold said second dispenser, and a second flow control valve configured to selectively divert the purified water for dispensing from said second dispenser, and said second wireless transceiver is operative to communicate across said second wireless communications link with said wireless transceiver of said main purification unit for controlling said second flow control valve.

23. The wireless system of claim 15 wherein said first support structure includes a base, a support arm extending from said base, and a bracket on said support arm, said first dispenser configured to be mounted in said bracket, and said base configured to support said first remote dispensing device on a surface.

24. The wireless system of claim 23 wherein said support arm is configured to be manipulated to position said first dispenser relative to said base when said first dispenser is mounted in said bracket.

25. The wireless apparatus of claim 15 wherein said first remote dispensing device includes a manifold configured to be fluidly coupled with the main purification unit for receiving the purified water supplied from the main purification unit, and said first flow control valve is configured to selectively divert the purified water from said manifold to said dispenser.

26. A wireless system for dispensing purified water, the wireless system comprising:
a first main purification unit configured to supply a first stream of the purified water a main purification unit configured to supply the purified water, the first main purification unit including a first wireless transceiver;
a second main purification unit configured to supply a second stream of the purified water, the second main purification unit including a second wireless transceiver;
a first remote dispensing device fluidly coupled with said first main purification unit, said first remote dispensing device including a first dispenser, a first support structure configured to hold said first dispenser, a first flow control valve configured to selectively divert the purified water for dispensing from said first dispenser, and a first wireless transceiver operative to communicate across a first wireless communications link with said first wireless transceiver for controlling said first flow control valve; and
a second remote dispensing device fluidly coupled with said second main purification unit, said second remote dispensing device including a second wireless transceiver operatively coupled with said second wireless transceiver of said second main purification unit for communication across a second wireless communications link.

27. The wireless system of claim 26 wherein said first wireless transceiver of said first main purification unit and said first wireless transceiver of said first remote dispensing device are adapted to communicate using ultrasonic signals or electromagnetic signals, and said second wireless transceiver of said second main purification unit and said second wireless transceiver of said second remote dispensing device are adapted to communicate using ultrasonic signals or electromagnetic signals.

28. The wireless system of claim 26 wherein said first wireless transceiver of said first main purification unit and said first wireless transceiver of said first remote dispensing device are adapted to communicate using ultrasonic signals or electromagnetic signals, and said second wireless transceiver of said second main purification unit and said second transceiver of said second remote dispensing device are adapted to communicate using microwave signals, radio-frequency signals, or optical signals.

29. The wireless system of claim 26 wherein each of said first and second remote dispensing devices includes a radio frequency identification transponder configured to store data, and each of said main purification units includes a tag reader configured to read the data stored by said radio frequency identification transponder of a corresponding one of said first and second remote dispensing devices.

30. The wireless system of claim 26 wherein each of said first and second remote dispensing devices includes a memory storage device configured to store data, and each of said main purification units includes a reader configured to read the data stored by said memory storage device of a corresponding one of said first and second remote dispensing devices.

31. The wireless system of claim 26 wherein at least one of said first and second remote dispensing devices further comprises a flow sensor adapted to detect a flow rate of the purified water.

32. The wireless system of claim 26 wherein at least one of said first and second main purification units further comprises a flow sensor adapted to detect a flow rate of the purified water.

33. The wireless system of claim 26 wherein said second remote dispensing device includes a second dispenser, a second support structure configured to hold said second dispenser, and a second flow control valve configured to selectively divert the purified water for dispensing from said second dispenser, and said second wireless transceiver is operative to communicate across said second wireless communications link with said second wireless transceiver of said second main purification unit for controlling said second flow control valve.

34. The wireless system of claim 26 wherein said first support structure includes a base, a support arm extending from said base, and a bracket on said support arm, said first dispenser configured to be mounted in said bracket, and said base configured to support said first remote dispensing device on a surface.

35. The wireless system of claim 34 wherein said support arm is configured to be manipulated to position said first dispenser relative to said base when said first dispenser is mounted in said bracket.

36. The wireless apparatus of claim 26 wherein said first remote dispensing device includes a manifold configured to be fluidly coupled with the first main purification unit for receiving the purified water supplied from the main purification unit, and said first flow control valve is configured to selectively divert the purified water from said manifold to said dispenser.

* * * * *

UNITED STATES PATENT AND TRADEMARK OFFICE
CERTIFICATE OF CORRECTION

| | | |
|---|---|---|
| PATENT NO. | : 7,824,543 B2 | Page 1 of 1 |
| APPLICATION NO. | : 11/537360 | |
| DATED | : November 2, 2010 | |
| INVENTOR(S) | : Thomas Joseph Larkner | |

It is certified that error appears in the above-identified patent and that said Letters Patent is hereby corrected as shown below:

In column 17, Claim 11, line 65, after "said", delete "maniforld of said".

Signed and Sealed this
Twenty-second Day of February, 2011

David J. Kappos
*Director of the United States Patent and Trademark Office*